J. ANDREW.
FILTER.
APPLICATION FILED FEB. 8, 1916.
1,213,140.
Patented Jan. 23, 1917.
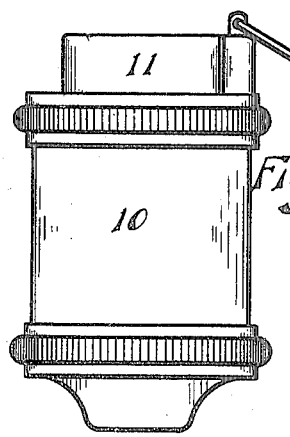
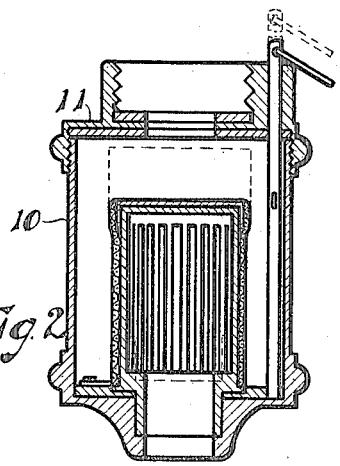
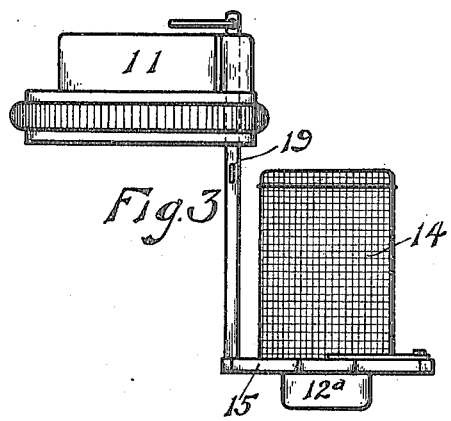
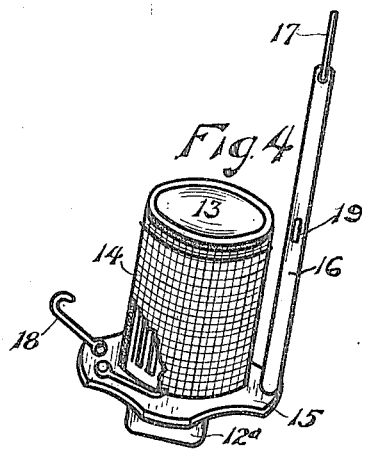
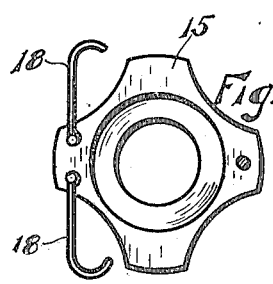
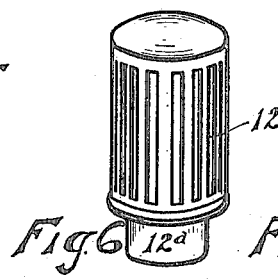
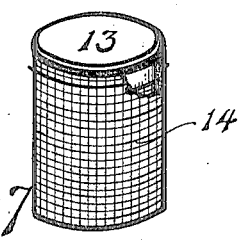
Inventor,
John Andrew,
By Frank N. Allen,
Frederick K. Daggett,
Attorneys.

UNITED STATES PATENT OFFICE.

JOHN ANDREW, OF CONCORD, NEW HAMPSHIRE.

FILTER.

1,213,140.  Specification of Letters Patent.  Patented Jan. 23, 1917.

Application filed February 8, 1916. Serial No. 76,948.

*To all whom it may concern:*

Be it known that I, JOHN ANDREW, a citizen of the United States, residing at Concord, in the county of Merrimack, in the State of New Hampshire, have invented a certain new and useful Improvement in Filters, of which the following is a specification, reference being had to the accompanying drawings.

This invention relates to water filters, of the type commonly attached to faucets, in household sinks and the like places, for separating dirt and other foreign material from the water, and the object of my said invention is to provide a reasonably cheap filter, of small size, in which special provision is made for readily flushing the filter without removing it from the faucet and reversing it, as is now necessary with many of the filters in common use.

Another, and valuable, feature of advantage in connection with my present improved filter is in the fact that no packing of granulated charcoal, sand, or other material, is used, to become quickly loaded and clogged with more or less filthy sediment through which the current of water must pass.

The annexed drawings illustrate my invention, Figure 1 being an elevation of a filter embodying my present improvements, and Fig. 2 is mainly a central, vertical, sectional view of said filter. In Fig. 3 I have illustrated the upper portion, or cap, of the filter with the filter proper mounted thereon, showing particularly the manner of positioning the filter cage when it is desired to remove the jacket of fabric. Fig. 4 is a perspective view of the filter cage and connected parts, a portion of the fabric being broken away, to disclose the cage. Fig. 5 is a plan view of the base upon which the cage is mounted when the several filter parts are assembled and ready for use. Fig. 6 is a perspective view of the said cage and Fig. 7 is a similar view of the jacket of fabric and of the metal cap to which said fabric is attached.

Referring to these drawings, the numeral 10 denotes the cylindrical body portion of the filter and 11 indicates a cap or top which is screwed upon said body and is also threaded internally so that it may be screwed upon an ordinary faucet or bib cock. The lower end wall of the body 10 is formed with a central opening through which the filtered water may be discharged. Within the housing thus provided is located what I term a filter cage 12 which is of relatively smaller diameter than the housing and is formed with a depending, integral, collar portion 12ª which is adapted to fit easily in the discharge opening at the lower end of the housing. The said cage is best illustrated in Fig. 6 of the annexed drawings and its circular body is formed as a longitudinally-slitted shell of thin material with a, preferably, closed top. The filtering material is coarse fabric that is wrapped around, and secured to, a metal cap 13, the jacket 14 thus provided being adapted to be slipped down onto the cage 12 as seen in Figs. 2, 3, and 4. The filter proper, thus provided, is seated in the rabbeted upper portion of a plate 15 which is fixed on the lower end of a rod 16 whose upper end portion is slidably mounted in the cap 11, and swiveled to the free end of said rod is a ring 17 by means of which the rod may be drawn upward a limited distance in order to change the position of the filter cage in the housing, as I will explain more fully later. Hinged to the plate 15 are hooks 18 that are adapted to be swung into engagement with the lower end portion of the jacket of fabric (after the cage has been seated in the plate 15) to prevent the accidental disarrangement of said cage with respect to the said plate (see Figs. 3 and 4).

When the complete filter is ready for use the jacketed cage is in its lowermost position, as seen in Fig. 2, that is to say the plate 15 rests upon the lower end wall of the housing and the collar 12ª is located in the discharge opening in the housing. When thus adjusted the water entering the housing from the top strikes the cap 13 and is deflected laterally and passes downward in the annular space between the cage and the inner wall of the housing. Because of the fact that the discharge opening is closed by the collar 12ª said water is forced to pass through the jacket 14 of fabric and into the cage 12, whence it escapes through the opening in the said collar. As the water passes thus through the fabric the foreign matter is separated from the water and adheres to the outer face of the fabric or is washed down upon the upper face of the plate 15. When it is desired to flush the filter it is only necessary to take hold of the ring 17 and draw up the rod 16, together with the connected plate 15 and the filter cage mounted on said plate until the cap 13 is nearly up to the top section 11 (see dotted lines Fig. 2). This movement raises the collar 12ª out of the discharge opening and permits the inflowing water to pass down along the outside of the fabric jacket and directly out through the discharge opening and, during the downward rush of the water, the accumulated sediment in the bottom of the housing, as well as upon the outer face of the fabric jacket, is washed downward and out through the discharge opening. The cage may then be lowered to its operative, or filtering, position, by simply pushing the rod 16 down as far as it will go, when the water is again caused to pass through the fabric before it can escape through the discharge opening.

When the fabric 14 becomes worn, or otherwise unfit for use, it may be readily replaced by a new jacket.

In order to properly limit the upward adjustment of the cage I provide a stop-pin 19 in the rod 16.

My described filter may be cheaply manufactured, it is effective as a means for filtering foreign matter from the water and it is specially convenient to operate whenever it becomes necessary or desirable to cleanse the filter by flushing it.

Having thus described my invention, I claim as new and wish to secure by Letters Patent:—

1. A filter, including a housing with an outlet through its bottom, an additional bottom member within said housing, having an opening coincident with said outlet and a recess in its upper surface, concentric with said opening, and a filtering chamber having a downward tubular extension received within the outlet of said housing, said filtering chamber being seated in the recess of said additional bottom member concentrically with said tubular extension and the point of reception of the latter within the outlet of said housing.

2. A filter, including a housing having an outlet through its bottom, an additional bottom member within said housing having an opening coincident with said outlet and a recess in its upper surface concentric with said opening and a filtering chamber having a downward tubular extension received within the outlet of said housing, said filtering chamber being seated in the recess of said additional bottom member concentrically with said tubular extension and the point of reception of the latter within the outlet of said housing, and means for lifting said additional bottom member, connected thereto and operable from a point exterior of said housing or filter.

3. A filter, including a housing having an outlet through its bottom, an additional bottom member within said housing having an opening coincident with said outlet and a recess in its upper surface concentric with said opening, a filtering chamber having a downward tubular extension received within the outlet of said housing, said filtering chamber being seated in the recess of said additional bottom member concentrically with said tubular extension and the point of reception of the latter within the outlet of said housing, means for lifting said additional bottom member, connected thereto and operable from a point exterior of the filter, said housing having an upper removable closure-section, and the latter having said lifting means extending therethrough and upon which, said closure section may be moved upwardly, when removing it from the body of the housing.

JOHN ANDREW.

Copies of this patent may be obtained for five cents each, by addressing the "Commissioner of Patents, Washington, D. C."